(12) United States Patent
Tseng et al.

(10) Patent No.: US 6,392,774 B1
(45) Date of Patent: May 21, 2002

(54) MULTIPLE POSITION GUIDING LENS IMAGE SCANNING METHOD

(75) Inventors: Jen-Shou Tseng, Miao-Li Hsien; Chun-Liang Lin, Hsin-Chu, both of (TW)

(73) Assignee: Umax Data Systems Inc., Hsin-Chu (TW)

( * ) Notice: Subject to any disclaimer, the term of this patent is extended or adjusted under 35 U.S.C. 154(b) by 0 days.

(21) Appl. No.: 09/682,135

(22) Filed: Jul. 26, 2001

(30) Foreign Application Priority Data

Aug. 28, 2000 (TW) .......................................... 089117355

(51) Int. Cl.⁷ ............................................. G02B 26/08
(52) U.S. Cl. ...................... 359/210; 359/201; 359/212; 359/900; 358/483; 358/494; 358/497
(58) Field of Search .................. 359/196, 201, 359/209–215, 223; 250/234–236; 358/474, 483, 487, 494, 497

(56) References Cited

U.S. PATENT DOCUMENTS 5,726,775 A * 3/1998 Walsh ......................... 358/488

* cited by examiner

*Primary Examiner*—James Phan
(74) *Attorney, Agent, or Firm*—Winston Hsu

(57) ABSTRACT

A scanner has a light and a scanning module for scanning light from a document and generating an image signal of the document. The scanning module has a plurality of light sensors, and a guiding lens for delivering light from the document to the light sensors. The guiding lens moves along a direction perpendicular to its own normal and may be set on at least a first position and a second position. The guiding lens is first set on the first position, and a reference picture is scanned to obtain a first reference image signal. The guiding lens is then set on the second position, and the reference picture is again scanned to obtain a second reference image signal. The guiding lens is then set to the first position or the second position, according to relative qualities of the first reference image signal and the second reference image signal.

18 Claims, 10 Drawing Sheets

MULTIPLE POSITION GUIDING LENS IMAGE SCANNING METHOD

BACKGROUND OF INVENTION

1. Field of the Invention

The present invention relates to a method of image scanning used in a scanner, and more particularly, to an image scanning method that improves scan quality.

2. Description of the Prior Art

Please refer to FIG. 1. FIG. 1 is a diagram of a prior art scanner 10. The scanner 10 comprises a light source 12 for illuminating a document 14 to be scanned, a transparent panel 16 for supporting the document 14, and a scanning module 18 for scanning light from the document 14. When performing a scan, the light source 12 and the scanning module 18 move simultaneously to scan the document 14.

As shown in FIG. 1, the scanning module 18 has a plurality of light sensors 20 for converting light from the light source 12 to digital image signals. Light is directed to the plurality of sensors 20 by three guiding lenses 22A, 22B, 22C and a lens 24.

A common problem is scratches or dust on one, or more, of the guiding lenses 22A, 22B, 22C, which leads to poor scan quality, examples including, but not limited to, shadows or stripes on the output image.

SUMMARY OF INVENTION

It is therefore a primary objective of the present invention to provide a method of image scanning that increases the probability of a quality scan.

In a preferred embodiment, the present invention provides a method of image scanning used in a scanner. The scanner comprises a light source for illuminating a document to be scanned, and a scanning module for scanning light from the document and generating an image signal of the document. The scanning module comprises a plurality of light sensors for sensing the light from the document, and a guiding lens for delivering light from the document to the light sensors. The guiding lens moves in a direction perpendicular to the normal of the guiding lens, and it may be set on at least a first and a second position. The method starts by using the light source and the scanning module to obtain a first reference image signal by scanning a reference picture at the first position. At the second position, the light source and the scanning module are used to obtain a second reference image signal by scanning a reference picture. According to the first reference image signal and the second reference image signal, the guiding lens is set to either the first position or the second position. Then, the document is scanned.

If the first reference image signal has fewer flawed areas than the second reference image signal, the guiding lens is moved to the first position to scan the document, and if the second reference image signal has fewer flawed areas than the first reference image signal, the guiding lens is moved to the second position to scan the document.

It is an advantage of the present invention that the probability of a quality scan is increased.

These and other objectives and advantages of the present invention will no doubt become obvious to those of ordinary skill in the art after having read the following detailed description of the preferred embodiment that is illustrated in the various figures and drawings.

DETAILED DESCRIPTION

Figure 1:
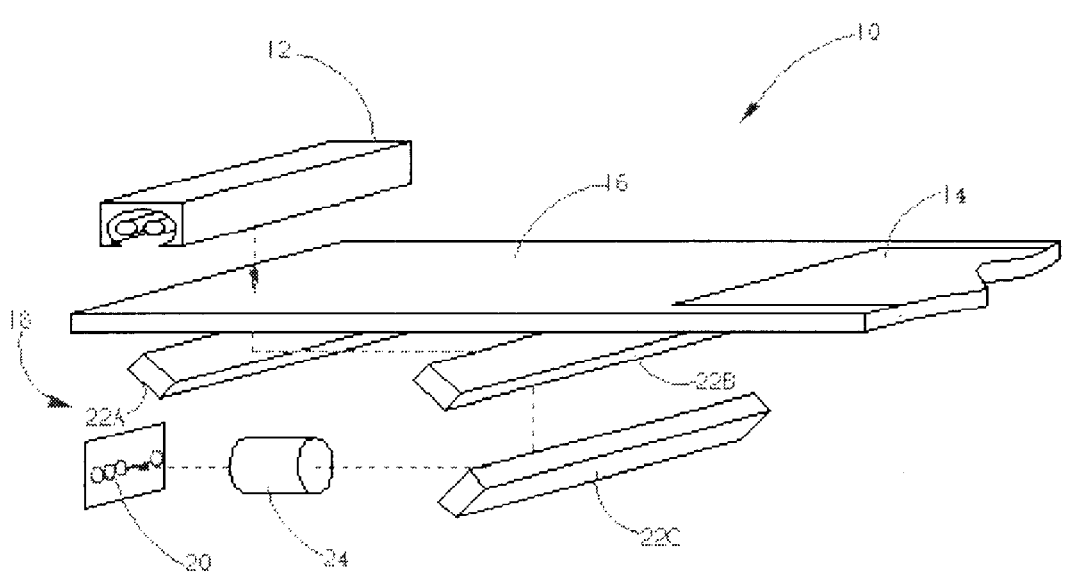
FIG. 1 is a diagram of a prior art scanner.
Figure 2:
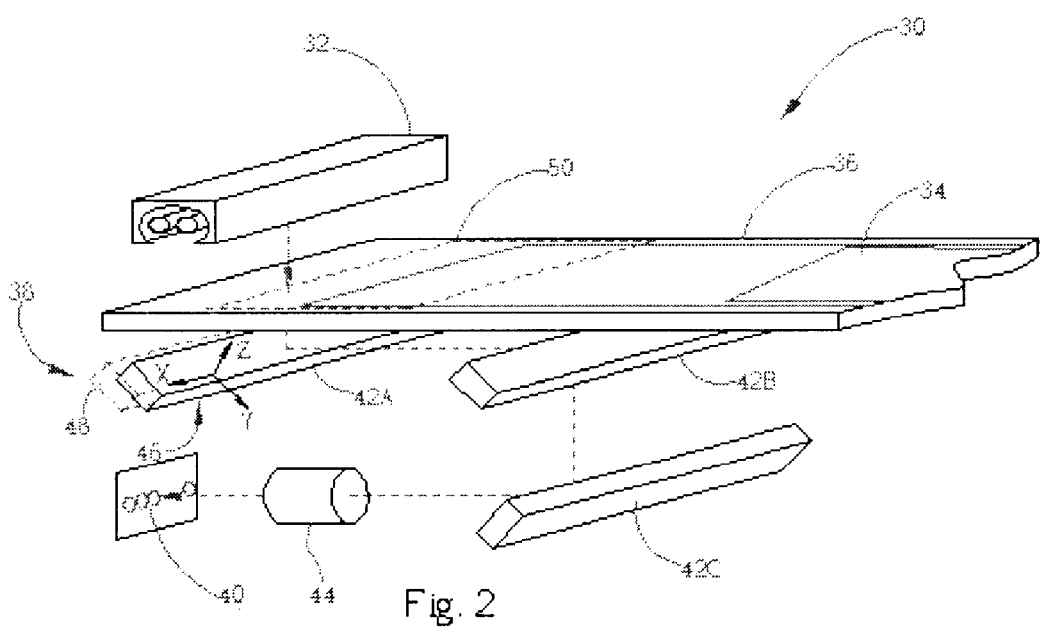
FIG. 2 is a diagram of the present invention scanner.
Figure 3:
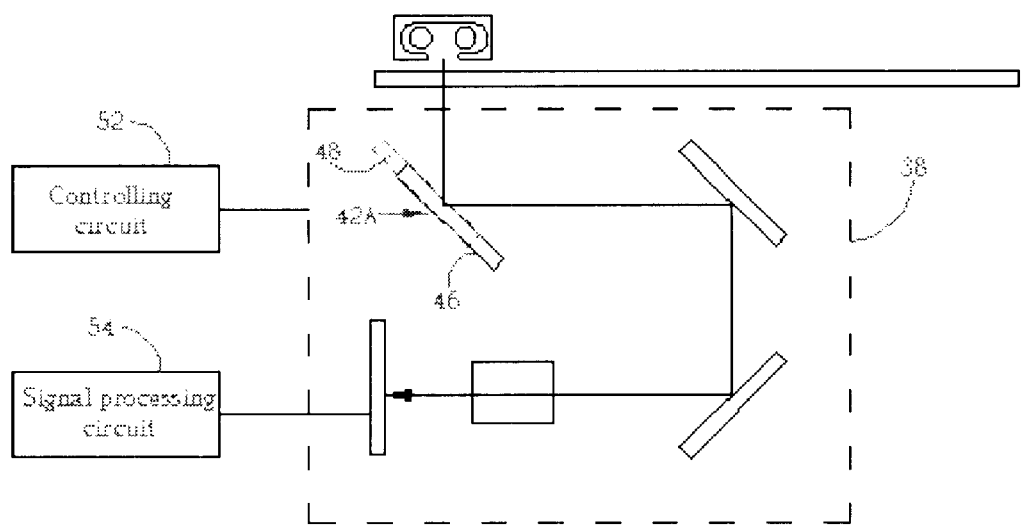
FIG. 3 is a diagram of a light path of the scanner shown in FIG. 2.

Please refer to FIG. 2 and FIG. 3. FIG. 2 is a perspective diagram of the present invention scanner 30. FIG. 3 is a diagram of a light path of the scanner 30 shown in FIG. 2. The scanner 30 has a light source 32, beneath which is a transparent panel 36, where a document 34 rests, beneath which is a scanning module 38. When performing a scan, the light source 32 moves simultaneously with the scanning module 38 to scan the document 34.

As shown in FIG. 2, the scanning module 38 has a plurality of light sensors 40, arranged linearly, a lens 44 for focusing the light onto the light sensors 40, and three guiding lenses 42A, 42B, 42C for directing the light from the light source 32 to the plurality of light sensors 40. The guiding lens 42A can move along a direction perpendicular to a normal (as shown, Z) of the guiding lens 42A. From FIG. 2, the guiding lens 42A can move on the X-Y plane. Thus, the guiding lens 42A can be set on at least a first position 46 and a second position 48. When the guiding lens 42A is at the first position 46, the light from the document 34 is reflected by a first area on the guiding lens 42A. When the guiding lens 42A is at the second position 48, the light from the document 34 is reflected by another area on the guiding lens 42A. The range of the two areas is not necessarily the same.

As shown in FIG. 2, the scanner 30 has a reference image 50. The reference image 50 is not only capable of acting as an image used for calibration in a prior art scanner but is also capable of acting as a known image. Before scanning the document 34, the scanner 30 scans the reference image 50 at different positions, obtaining different reference image signals. As shown in FIG. 3, a signal processing circuit 54 electrically connected to the plurality of sensors 40 analyzes the incoming image signals.

Figure 4:
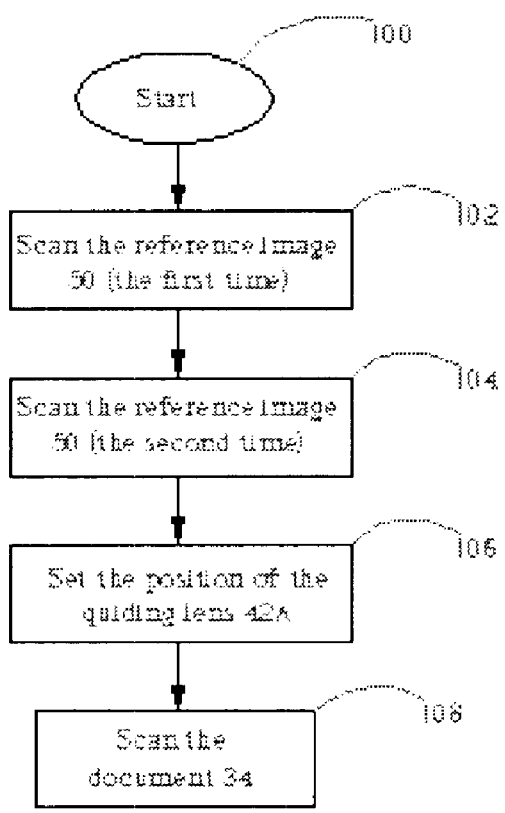
FIG. 4 is a flow chart of scanning procedures of a first preferred embodiment scanner shown in FIG. 2.
Figure 5:
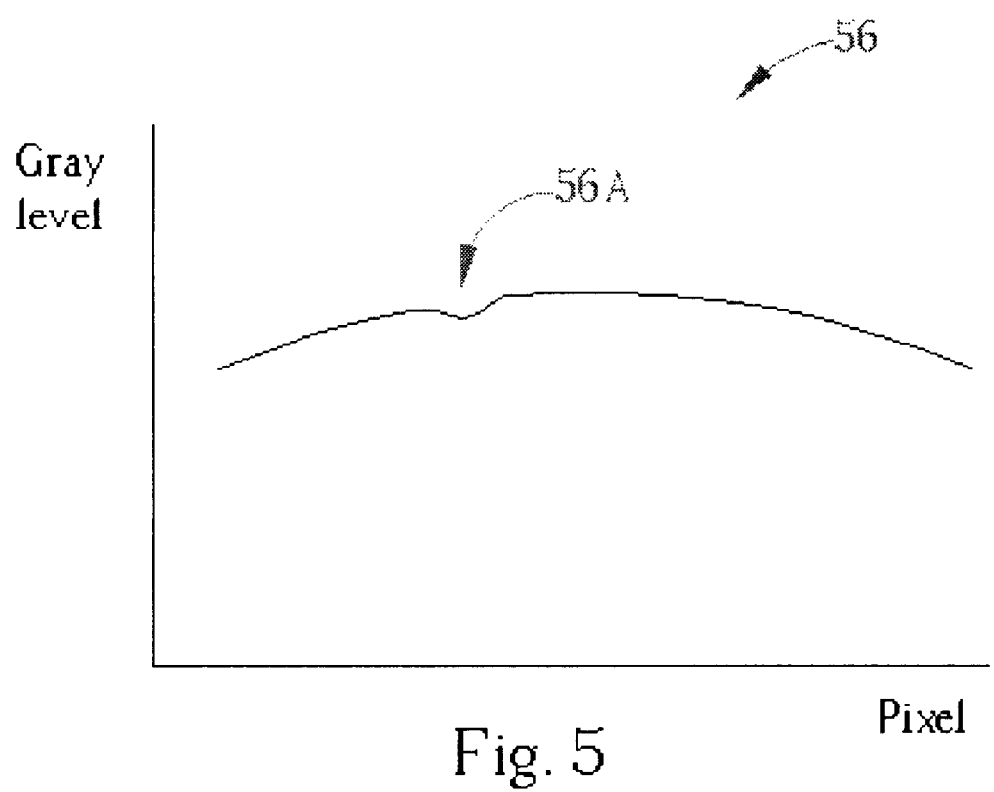
FIG. 5 is a diagram of a first reference image signal obtained by the scanning procedures shown in FIG. 4.
Figure 6:
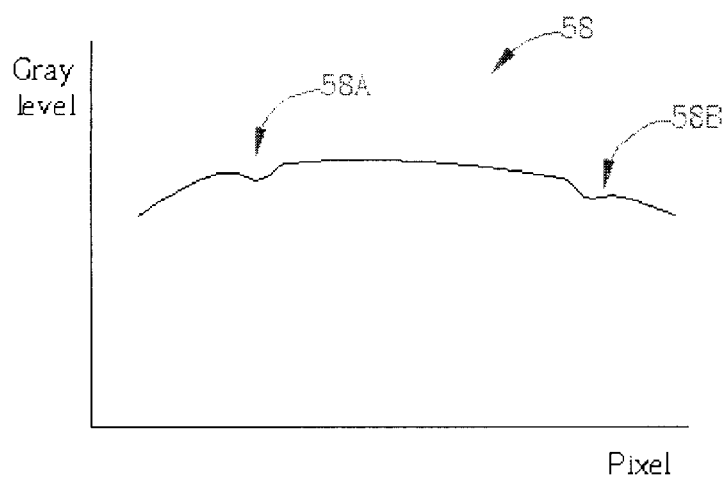
FIG. 6 is a diagram of a second reference image signal obtained by the scanning procedures shown in FIG. 4.

Please refer to FIG. 4 to FIG. 6. FIG. 4 is a flow chart of scanning procedures of a first preferred embodiment of the method for the scanner 30 shown in FIG. 2. FIG. 5 is a diagram of a first reference image signal 56 obtained by following the flow chart shown in FIG. 4. FIG. 6 is a diagram of a second reference image signal 58 obtained by following the flow chart shown in FIG. 4. The first preferred embodiment of the present invention scanning method is:

Step 100: Start the scan process.

Step 102: Position the guiding lens 42A at the first position 46 and use the light source 32 and the scanning module 38 to scan the reference image 50 to obtain the first reference image signal 56.

Step 104: Position the guiding lens 42A at the second position 48 and use the light source 32 and the scanning module 38 to scan the reference image 50 to obtain the second reference image signal 58.

Step 106: Position the guiding lens 42A at the first position 46 or the second position 48 according to the number of flawed areas in the first and the second reference image signals 56, 58.

Step 108: Scan the document 34 to be scanned, and output the final image signal.

As mentioned above, the controlling circuit 52 positions the guiding lens 42A at the first position 46 and the second position 48. It scans the reference image 50 twice, obtaining the first and the second reference image signals 56, 58, respectively. Next, the signal processing circuit 54 analyzes the flawed areas in the first and the second reference image signals. If the flawed areas in the first reference image signal 56 are fewer than the flawed areas in the second reference image signal 58, the guiding lens 42A is positioned on the first position 46. If the flawed areas in the second reference image signal 58 are fewer than the flawed areas in the first reference image signal 56, the guiding lens 42A is positioned on the second position 48. The document 34 is then scanned.

For example, as shown in FIG. 5 and FIG. 6, first reference image signal 56 has a flawed area 56A, and the second reference image signal 58 has flawed areas 58A and 58B. Reference image signal 56 has fewer flawed areas than reference image signal 58 does. So, the controlling circuit 50 positions the guiding lens 42A on the first position 46. Then, the document 34 is scanned. In this manner, scan quality is improved.

The above guiding lens 42A is not limited to two positions, and the guiding lens capable of moving is also not limited to the guiding lens 42A. Designers can design the guiding lenses 42A, 42B, or 42C to set on more than two positions, depending on design preference. Additionally, the present invention is not limited to only one guiding lens 42A, 42B, or 42C that is capable of moving. If more than one guiding lens is capable of moving along a direction perpendicular to its own normal, and setting on a plurality of positions, this also conforms to the present invention. For the case of multiple movable guiding lenses, many positioning combinations are possible. Comparison can then take place on a plurality of reference images, the best image being chosen for the final scan. In this way, better scanning quality is obtained.

Figure 7:
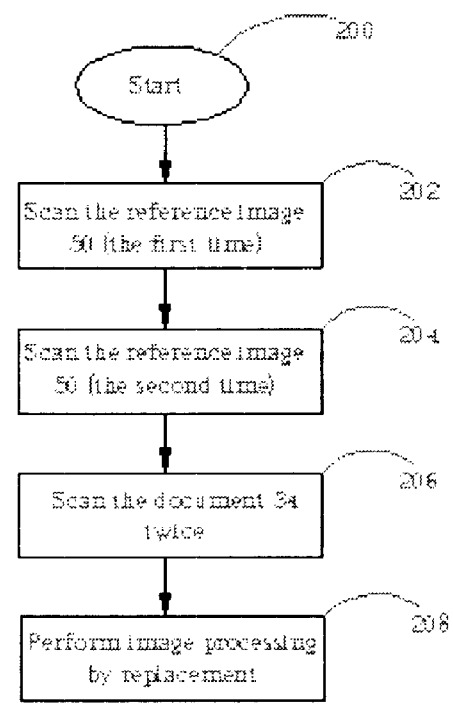
FIG. 7 is a flow chart of scanning procedures of a second preferred embodiment scanner shown in FIG. 2.
Figure 8:
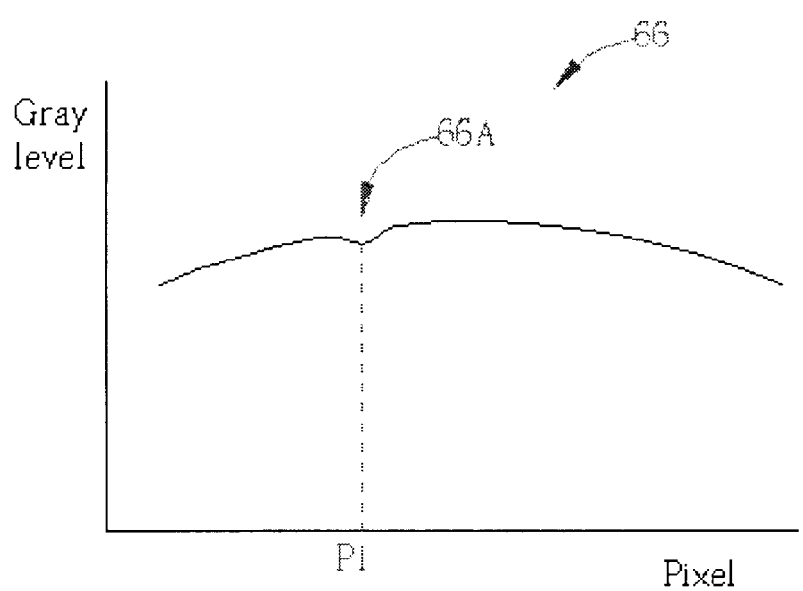
FIG. 8 is a diagram of a first reference image signal obtained by the scanning procedures shown in FIG. 7.
Figure 9:
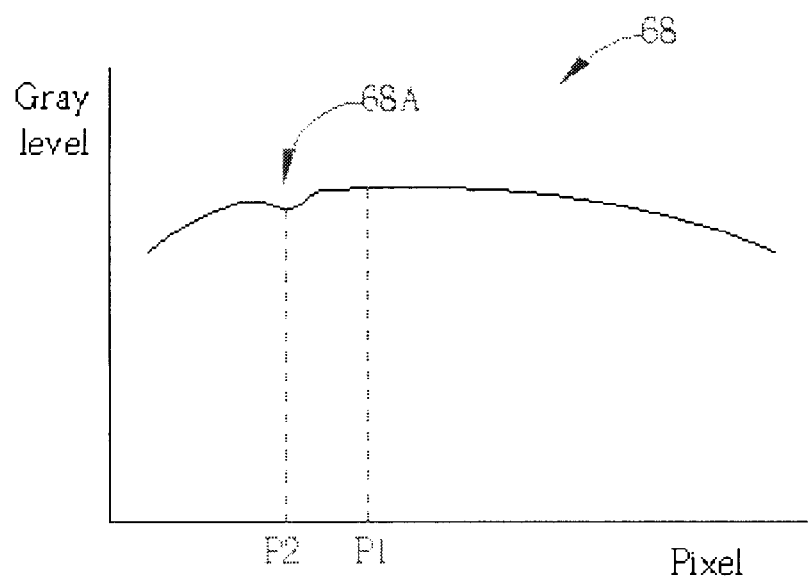
FIG. 9 is a diagram of a second reference image signal obtained by the scanning procedures shown in FIG. 7.

Please refer to FIG. 7 to FIG. 9. FIG. 7 is a flow chart of scanning procedures of a second preferred embodiment of the method for the scanner 30 shown in FIG. 2. FIG. 8 is a diagram of a first reference image signal 66 obtained by following the flow chart shown in FIG. 7. FIG. 9 is a diagram of a second reference image signal 68 obtained by following the flow chart shown in FIG. 7. The second preferred embodiment of the present invention scanning method is: Step 200: Start the scan process.

Step 202: Position the guiding lens 42A at the first position 46, and use the light source 32 and the scanning module 38 to scan the reference image 50 to obtain the first reference image signal 66.

Step 204: Position the guiding lens 42A at the second position 48, and use the light source 32 and the scanning module 38 to scan the reference image 50 to obtain the second reference image signal 68.

Step 206: Scan the document 34 twice to obtain a first document image signal and a second document image signal.

Step 208: From the first and the second reference image signal 66 and 68, perform image processing on the image signal obtained by scanning the document 34, using replacement to generate an output image.

The controlling circuit 52 positions the guiding lens 42A at the first position 46 and the second position 48. The reference image 50 is scanned twice, obtaining the first and the second reference image signals 66, 68. Next, the first and the second document image signals are scanned. The signal processing circuit 54 analyzes the flawed areas in the first and the second reference image signals 66, 68. The signal processing circuit 54 then performs image processing on the first document image signal according to the flawed areas in the first and the second reference image signals 66, 68. When performing image processing, the signal processing circuit 54 replaces the image data of the flawed areas in the first document image signal with corresponding image data from the second document image signal.

For example, as shown in FIG. 8 and FIG. 9, the first reference image signal 66 has a flawed area 66A, at a position P1, and the second reference image signal 68a has a flawed area 68A, at a position P2. The signal processing circuit 54 replaces the image data at P1 in the first document image signal with the image data at P1 in the second document image signal. This improves scan quality.

Figure 10:
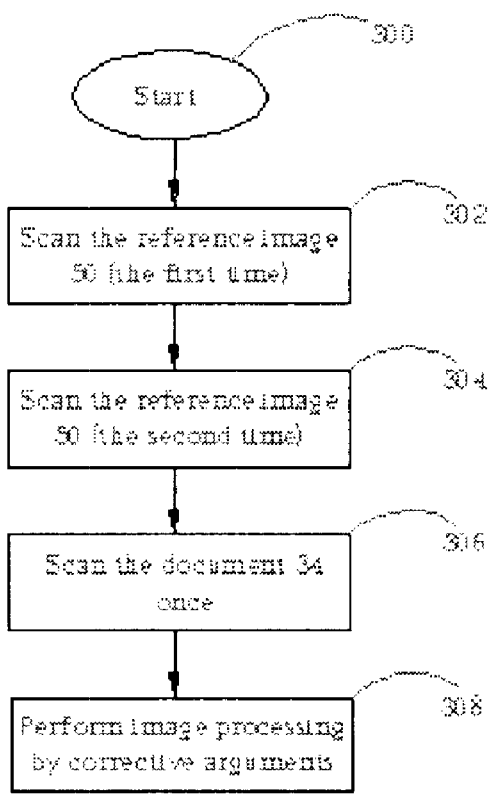
FIG. 10 is a flow chart of scanning procedures of a third preferred embodiment scanner shown in FIG. 2.

Please refer to FIG. 10. FIG. 10 is a flow chart of the scanning procedures of a third preferred embodiment of the method for the scanner 30 shown in FIG. 2. The third preferred embodiment of the present invention scanning method is: Step 300: Start the scan process.

Step 302: Position the guiding lens 42A at the first position 46, and use the light source 32 and the scanning module 38 to scan the reference image 50 to obtain the first reference image signal 66.

Step 304: Position the guiding lens 42A at the second position 48, and use the light source 32 and the scanning module 38 to scan the reference image 50 to obtain the second reference image signal 68.

Step 306: Scan the document 34 once to obtain a document image signal.

Step 308: Perform image processing on the image signal obtained from the scanned document 34 that uses correction to generate an output image according to the first and the second reference image signal 66, 68.

In this embodiment, after obtaining the reference image signals 66, 68, the controlling circuit 52 only scans the document 34 once to obtain the document image signal. The signal processing circuit 54 creates a set of corrective arguments to perform the image processing step in the third document image according to the data of the flawed areas in the first and second reference image signals 66, 68. There are many methods of prior art parameter image processing, such as averages, trend forecasting, etc. Actually, having just obtained the first and the second reference image signals 66, 68 according to the methods of the present invention, the third document image is capable of using the method of the prior art image processing to improve scan quality.

Of course, the second and the third preferred embodiment of the present invention can also work for a plurality of movable guiding lenses. Each guiding lens is not limited to two positions. Furthermore, the preferred embodiment above is described for the case of a transmitted scanner, i.e. the light source 32 is above the transparent panel 36, and light transmitted through the document 34 is utilized to scan the document 34. In fact, the scanning method of the present invention can be used in a reflective scanner, i.e. the light source 32 is under the transparent panel 36, and light reflected from the document 34 is utilized to scan the document 34. In either case, the objective of the present invention is still achieved.

In addition, the first and second steps 102, 104, 202, 204, 302, 304 of the present invention for scanning the reference image 50 can be combined with monochrome (or chromatic) calibration of the prior art scanner. In general, before the prior art scanner formally performs the document scan, it usually first performs a monochrome (or chromatic) calibration. Calibration is performed by scanning a monochrome (or chromatic) reference image to obtain the monochrome (or chromatic) reference image signals to supply information needed by the monochrome (or chromatic) calibration unit. Therefore, the first and second reference signals 56, 58 can be obtained directly during calibration scans of the prior art.

In contrast to the scanning method of the prior art scanner 10, the present invention scanning method can position the guiding lens at different positions. The scanner then decides the best position at which to scan the document, or it can use the information from the reference signals to perform image processing on the final document scan. In this manner, shadows and stripes on the final output, due to digs or dust on the guiding lens can be reduced, and the probability of a good scan increases.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of image scanning used in a scanner, the scanner having a light source for illuminating a document to be scanned, and a scanning module for scanning light from the document and generating an image signal of the document, the scanning module having a plurality of light sensors for sensing the light from the document, and at least a guiding lens for delivering light from the document to the light sensors, the guiding lens moving along a direction perpendicular to a normal of the guiding lens and capable of being set on at least a first position and a second position, the method comprising:

setting the guiding lens on the first position, and using the light source and the scanning module to scan a reference picture to obtain a first reference image signal;

setting the guiding lens on the second position, and using the light source and the scanning module to scan the reference picture to obtain a second reference image signal;

setting the guiding lens to the first position or the second position according to the first reference image signal and the second reference image signal; and scanning the document;

wherein if the first reference image signal has fewer flawed areas than the second reference image signal, the guiding lens is moved to the first position to scan the document, and if the second reference image signal has fewer flawed areas than the first reference image signal, the guiding lens is moved to the second position to scan the document.

2. The method of claim 1 wherein the light sensor and the scanning module move simultaneously.

3. The method of claim 1 wherein the light source is used to scan the document by way of reflection.

4. The method of claim 1 wherein the light source is used to scan the document by the way of transmission.

5. The method of claim 1 wherein the scanner further comprises a controlling circuit electrically connected to the scanning module for controlling operations of the scanning module and the guiding lens.

6. The method of claim 1 wherein the scanner further comprises a signal processing circuit electrically connected to the sensors for analyzing flawed areas in the first reference image signals and the second reference image signals.

7. The method of claim 1 wherein the light sensors are linearly arranged.

8. The method of claim 1 wherein the scanning module comprises a plurality of guiding lenses for directing light from the light source to the light sensors, and each guiding lens moves along a direction perpendicular to a normal of the corresponding guiding lens and is capable of being set on a plurality of positions, the plurality of positions of the plurality of guiding lenses producing a plurality of different combinations of positions of the guiding lenses, and the method involves scanning the reference picture to obtain a plurality of image signals for the different combinations of positions of the guiding lenses and sets the plurality of guiding lenses on one of the plurality of position combinations to perform scanning of the document according to flawed areas in the plurality of image signals.

9. A method of image scanning used in a scanner, the scanner having a light source for illuminating a document to be scanned, and a scanning module for receiving light from the document from the light source and generating an image signal of the document, the scanning module having a plurality of light sensors for sensing light from the document, and at least a guiding lens for delivering light from the document to the sensors, the guiding lenses moving along directions perpendicular to a normal of each guiding lens and each capable of being set on at least a first position and a second position, the method comprising:

setting each guiding lens on the corresponding first position, and using the light source and the scanning module to scan a reference picture to obtain a first reference image signal;

setting each guiding lens on the corresponding second position, and using the light source and the scanning module to scan the reference picture to obtain a second reference image signal;

scanning the document; and performing an image processing step on image signals obtained from the document to generate an output image according to the first and the second reference image signals.

10. The method of claim 9 wherein the scanner further comprises a controlling circuit electrically connected to the scanning module for controlling operations of the scanning module and the guiding lenses, and a signal processing circuit electrically connected to the sensors for analyzing flawed areas in the first and the second reference image signals and for performing the image processing step.

11. The method of claim 10 wherein the controlling circuit controls the scanning module to scan the document twice to obtain a first document image signal and a second document image signal, and the signal processing circuit performs the image processing step on the first document image signal according to flawed areas in the first and the second reference image signals and data from the second document image signal.

12. The method of claim 11 wherein when performing the image processing step on the first document image signal, the image processing circuit replaces flawed areas of the first document image signal with corresponding image data from the second document image signal.

13. The method of claim 10 wherein the controlling circuit controls the scanning module to scan the document once to obtain a third document image signal, and the signal processing circuit generates a set of corrective arguments to perform the image processing step on the third document image signal according to flawed areas in the first reference image signal and the second reference image signal.

14. The method of claim 9 wherein the light sensor and the scanning module move simultaneously.

15. The method of claim 9 wherein the light source is used to scan the document by the way of reflection.

16. The method of claim 9 wherein the light source is used to scan the document by the way of transmission.

17. The method of claim 9 wherein the light sensors are linearly arranged.

18. The method of claim 9 wherein the scanning module comprises a plurality of guiding lenses for directing light from the light source to the sensors, each guiding lens moving along a direction perpendicular to pa normal of the guiding lens and capable of being set on a plurality of positions, the plurality of positions of the plurality of guiding lenses producing a plurality of different combinations of positions of the guiding lenses, and the method involves scanning the reference picture to obtain a plurality of image signals at different combinations of positions of guiding lenses and performing the image processing step on the image signals from the document to produce the output image according to data in flawed areas in the plurality of image signals.

* * * * *